(12) United States Patent
Dechu et al.

(10) Patent No.: US 9,980,099 B2
(45) Date of Patent: May 22, 2018

(54) INDOOR LOCATION DETECTION USING CEILING PATTERNS

(71) Applicant: International Business Machines Corporation, Armonk, NY (US)

(72) Inventors: Sampath Dechu, Bangalore (IN); Saicharan Duppati, Nellore (IN); Mohit Jain, Seattle, WA (US); Megha Nawhal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/042,594

(22) Filed: Feb. 12, 2016

(65) Prior Publication Data

US 2017/0238147 A1    Aug. 17, 2017

(51) Int. Cl.
*H04W 4/02*    (2018.01)
*H04W 4/04*    (2009.01)
*G06T 1/00*    (2006.01)
*G06T 3/00*    (2006.01)
*G06T 7/00*    (2017.01)
*G06T 5/00*    (2006.01)
*G06K 9/00*    (2006.01)

(52) U.S. Cl.
CPC ........ *H04W 4/043* (2013.01); *G06K 9/00671* (2013.01); *G06T 1/0007* (2013.01); *G06T 3/0006* (2013.01); *G06T 5/003* (2013.01); *G06T 7/004* (2013.01); *G06T 7/0085* (2013.01); *G06T 2207/20182* (2013.01); *G06T 2207/30208* (2013.01)

(58) Field of Classification Search
CPC ... G06T 7/0085; G06T 1/0007; G06T 3/0006; G06T 7/004; G06T 5/003; G06T 2207/20182; G06T 2207/30208; G06K 9/00671; H04W 4/043
USPC ............................................... 455/456.1–457
See application file for complete search history.

(56) References Cited

U.S. PATENT DOCUMENTS

| 6,400,956 | B1* | 6/2002 | Richton | H04W 4/02 340/988 |
| 8,284,100 | B2 | 10/2012 | Vartanian et al. | |
| 8,583,400 | B2 | 11/2013 | Thrun et al. | |
| 8,588,097 | B1 | 11/2013 | Ogale et al. | |
| 9,080,874 | B2 | 7/2015 | Haverinen | |
| 2006/0095540 | A1* | 5/2006 | Anderson | H04N 1/00281 709/217 |
| 2006/0154674 | A1* | 7/2006 | Landschaft | H04M 1/72572 455/456.6 |
| 2014/0153773 | A1* | 6/2014 | Gupta | G06K 9/6202 382/103 |

(Continued)

*Primary Examiner* — Marcus Hammonds
(74) *Attorney, Agent, or Firm* — Ference & Associates LLC

(57) ABSTRACT

One embodiment provides a method for location detection using an indoor ceiling pattern within a building, the method including: utilizing at least one processor to execute computer code that performs the steps of: capturing, using an image capture device, an image of the indoor ceiling pattern; identifying, within the image, at least one object; generating, based on the at least one object, a key matrix; determining if the key matrix matches a subset of a known key matrix; and responsive to the determining, identifying, based on the known key matrix, a location of the image capture device within the building. Other aspects are described and claimed.

20 Claims, 5 Drawing Sheets

(56) References Cited

U.S. PATENT DOCUMENTS

2015/0243080 A1 8/2015 Steinbach et al.
2017/0138740 A1* 5/2017 Almalki .............. G01C 21/206

* cited by examiner $$
500 \begin{array}{ccc} 2 & 0 & 3 \\ 0 & 4 & 0 \\ 1 & 0 & 3 \end{array}
$$

FIG. 5A

$$
501 \diagdown \begin{array}{cccccccc} 1 & 0 & 4 & 0 & 0 & 3 & 0 & 2 \\ 0 & 2 & 0 & 3 & 0 & 0 & 4 & 1 \\ 0 & 0 & 4 & 0 & 0 & 2 & 1 & 3 \\ 0 & 0 & 0 & 1 & 0 & 3 & 2 & 0 \\ 500 & & & & & & & \\ 0 & 0 & 3 & 2 & 0 & 0 & 1 & 3 \\ 3 & 0 & 2 & 0 & 2 & 0 & 0 & 0 \end{array}
$$

FIG. 5B

INDOOR LOCATION DETECTION USING CEILING PATTERNS

BACKGROUND

Electronic devices (e.g., smartphones, tablets, laptops, etc.) are more portable now than ever before. In fact, it is generally assumed that most individuals carry an electronic device at all times. These mobile devices help enable users to complete a large number of tasks through the use of applications. Some applications may require user information (e.g., user location) to properly function. Thus, most mobile devices contain built in sensors to gather potentially useful information, such as location, regarding a user and their surroundings.

One of the most collected pieces of user information is the location of a user and their device. This is typically done using a Global Positioning System (GPS), cellular tower triangulation, or the like. However, there are many instances when GPS is unavailable or unable to accurately locate a mobile device (e.g., inside buildings, underground, etc.). Although some potential solutions exist (e.g., WiFi location detection), a need exists for a more accurate and trustworthy method of detecting user/device location when out of GPS range, such as inside the building.

BRIEF SUMMARY

In summary, one aspect of the invention provides a method for location detection using an indoor ceiling pattern within a building, the method comprising: utilizing at least one processor to execute computer code that performs the steps of: capturing, using an image capture device, an image of the indoor ceiling pattern; identifying, within the image, at least one object; generating, based on the at least one object, a key matrix; determining if the key matrix matches a subset of a known key matrix; and responsive to the determining, identifying, based on the known key matrix, a location of the image capture device within the building.

Another aspect of the invention provides an apparatus for location detection using an indoor ceiling pattern within a building, the apparatus comprising: at least one processor; and a computer readable storage medium having computer readable program code embodied therewith and executable by the at least one processor, the computer readable program code comprising: computer readable program code that captures, using an image capture device, an image of the indoor ceiling pattern; computer readable program code that identifies, within the image, at least one object; computer readable program code that generates, based on the at least one object, a key matrix; computer readable program code that determines if the key matrix matches a subset of a known key matrix; and computer readable program code that, responsive to the determining, identifies, based on the known key matrix, a location of the image capture device within the building.

An additional aspect of the invention provides a computer program product for location detection using an indoor ceiling pattern within a building, the computer program product comprising: a computer readable storage medium having computer readable program code embodied therewith, the computer readable program code comprising: computer readable program code that captures, using an image capture device, an image of the indoor ceiling pattern; computer readable program code that identifies, within the image, at least one object; computer readable program code that generates, based on the at least one object, a key matrix; computer readable program code that determines if the key matrix matches a subset of a known key matrix; and computer readable program code that, responsive to the determining, identifies, based on the known key matrix, a location of the image capture device within the building.

A further aspect of the invention provides a method, comprising: utilizing at least one processor to execute computer code that performs the steps of: creating a numerical representation of an image captured via a mobile device, the image comprising ceiling tiles, wherein the numerical representation comprises a key matrix; searching for the key matrix within a known matrix, wherein the known matrix comprises a numerical representation of a known ceiling pattern within a building; responsive to finding the key matrix within the known matrix, identifying, based on the known matrix, a location represented by the key matrix; and identifying a location, based on the represented location, of the mobile device when the image is captured.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5A illustrates an example key matrix subset.

FIG. 5B illustrates an example key matrix.

DETAILED DESCRIPTION

Figure 1:
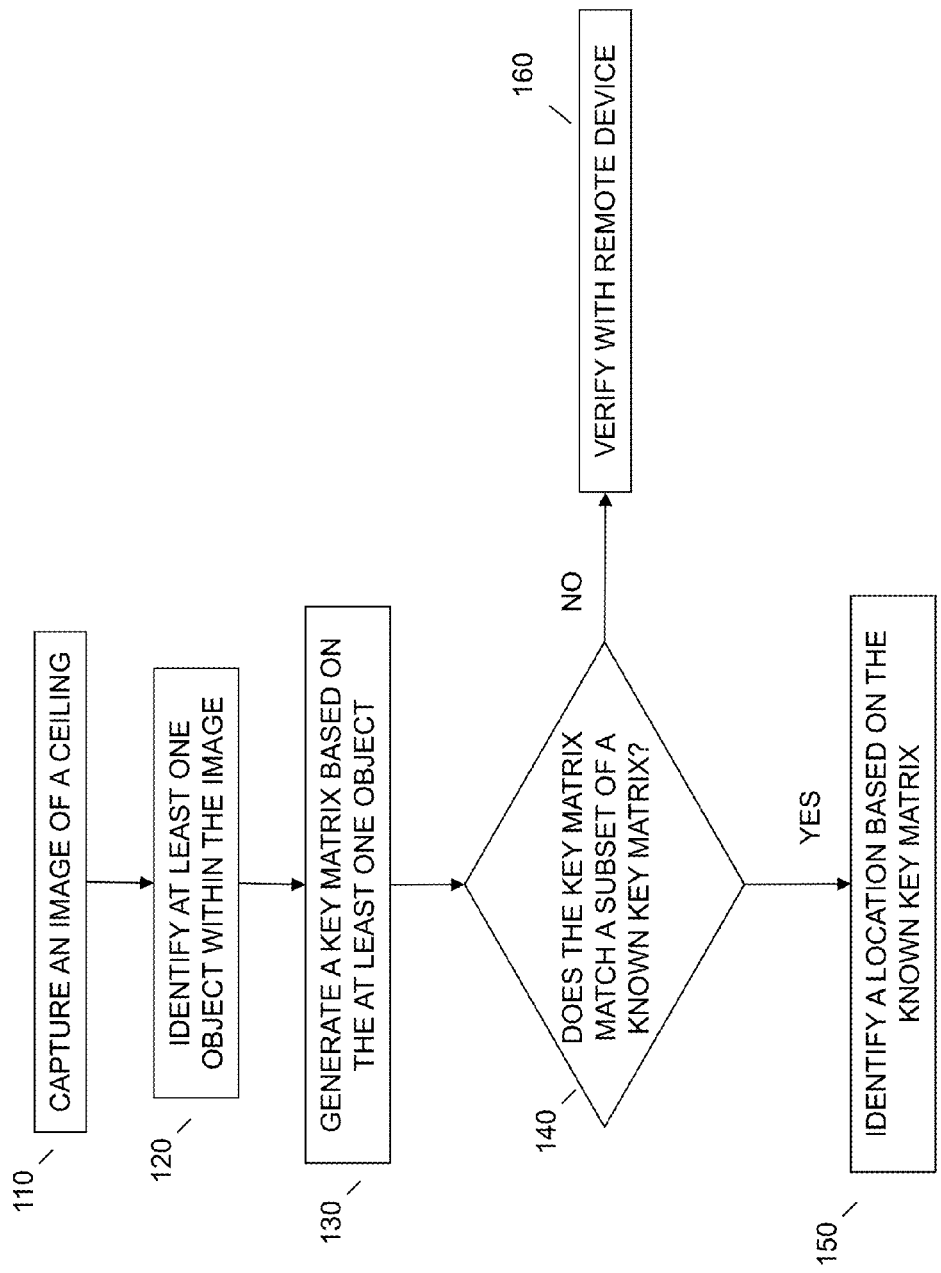
FIG. 1 schematically illustrates a method for indoor location detection using ceiling patterns.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to the figures. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

As discussed herein, smart phones are ubiquitous in today's society. Almost everyone owns a smart phone or tablet which they carry with them everywhere. In a workplace setting, employees generally keep their phone lying on a table or desk in their office, meeting room, cubicle, lunch space, etc. when not in use. Thus, because most people carry their devices around, the location of a user's device (e.g., phone) is typically a good indication of user location as well.

Therefore, a solution is needed to accurately determine a device location when a mobile device is out of GPS range (e.g., inside a building). Generally, most of today's smart phones have an image capture device (e.g., a camera); in fact, most smart phones have a camera on the front side and back side of the device. Thus, it may be possible to leverage the ability to capture image data, analyze the image data, and determine a device location.

One of the most universal visual identifiers in a typical office space is a drop ceiling. A drop ceiling is generally a secondary ceiling, hung below the main (e.g., structural) ceiling. Drop ceilings may also be referred to as a dropped ceiling, T-bar ceiling, false ceiling, suspended ceiling, grid ceiling, drop in ceiling, drop out ceiling, or ceiling tiles. For simplicity purpose, the term drop ceiling will be used throughout this specification, however, it should be noted that any of the above terms are interchangeable and that drop ceiling is non-limiting. Drop ceilings are a staple of modern construction and architecture in both residential and commercial applications.

A typical drop ceiling consists of a grid style layout comprised of metal channels in the shape of an upside-down "T" and suspended on wires from the overhead structural ceiling. Generally, each cell (i.e., the space between the channels) is filled with lightweight ceiling tiles or panels which drop into the grid and rest on the channels. There are several standards for drop ceilings (e.g., FM Global, UL, ICC-ES, NFPA 13, etc.). Because of these standards and general manufacturing principles, most drop ceilings are similar and uniform in nature. However, the pattern and layout of additional objects can be very unique from room to room or zone to zone.

For example, a ceiling may contain items such as: heating and cooling diffusers, lights, Wi-Fi antennae, fire detector, speaker, water sprinkler, etc. Because these objects can be specific in appearance (e.g., size, color, shape, etc.), they can be used as visual indicators associated with specific locations. Thus, an embodiment may capture image information (e.g., take a picture) of an area of a ceiling. Once the image information is captured, a further embodiment may process the image in order to identify particular objects and their location relative to other objects and tiles. Based on the objects, an embodiment may then create a key matrix which contains numerical identifiers related to each object type.

An embodiment then compares the created key matrix to a larger known key matrix. During the comparison, a sequence pattern is identified within the larger known key matrix that matches the sequence pattern created key matrix. Based on this identification, an embodiment can then determine a device location based on previously known information associated with the larger known key matrix (e.g., which room has that pattern captured in the image).

Figure 2:
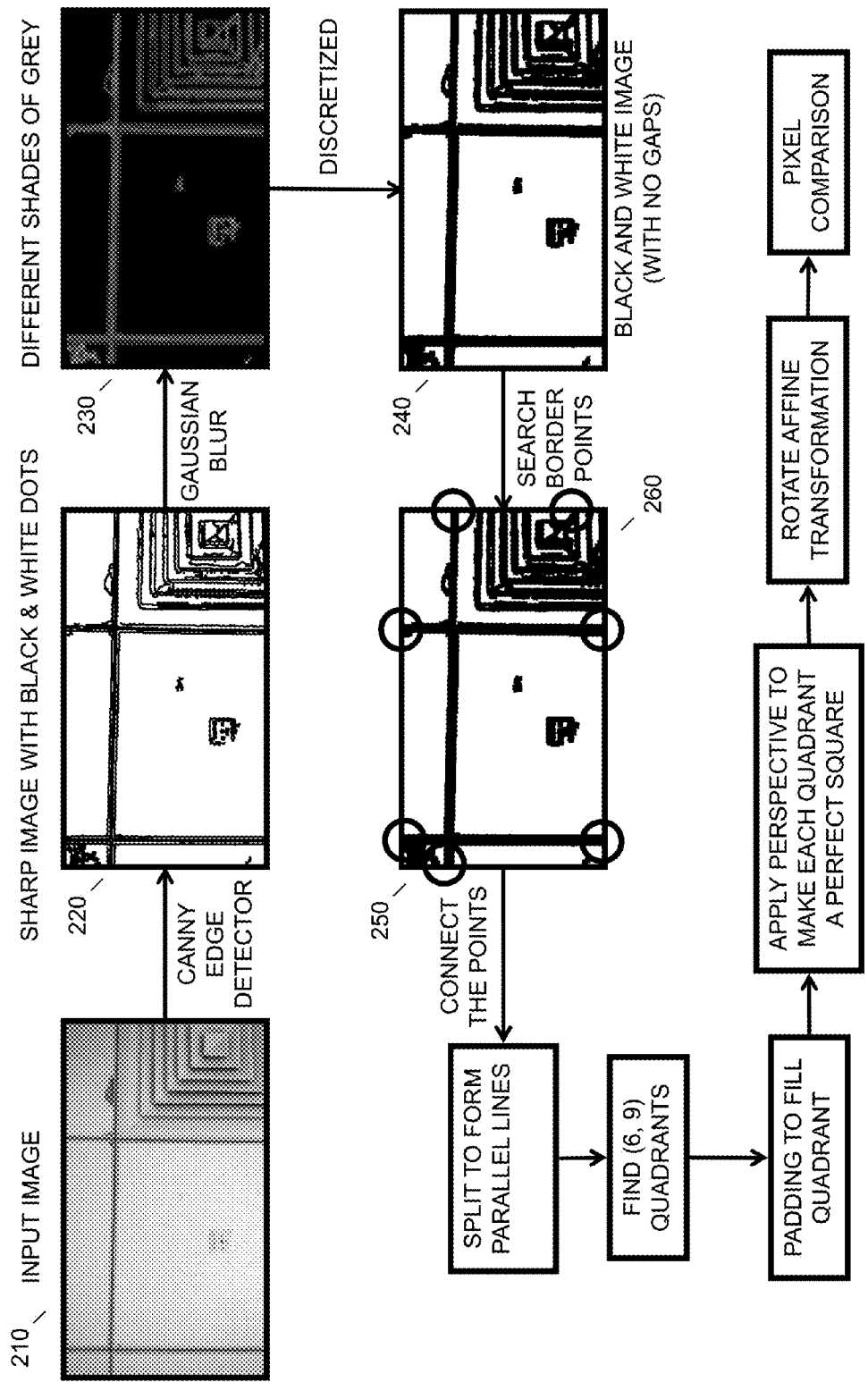
FIG. 2 illustrates an example of processing the ceiling image.

Referring now to FIG. 1, an embodiment may capture an image of a ceiling at 110. Generally, as discussed herein, mobile devices (e.g., smart phones, tablets, etc.) have an image capture device (e.g., camera lens) located on the device itself. In fact, many of the current devices have cameras on the front and back of the device. Thus, for example, if a user rests their smartphone upon their desk, one of the two available cameras will be directed toward the ceiling. Thus, an embodiment utilizes the upward facing camera to capture an image of the ceiling directly above the device.

In one embodiment, the image capture device may be activated based on various factors, or even on constantly. One embodiment may, in an effort to conserve battery, limit when the image capture device is turned on. For example, an embodiment may detect using one or more sensors (e.g., accelerometers, gyroscopes, infrared emitter and detector, force sensors, etc.) if a mobile device is stationary, resting on a level surface, and/or directed in an orientation that would allow an image capture device to capture a ceiling image.

By way of further example, an embodiment may require a mobile device to be stationary for a predetermined time period (e.g., 5 minutes) before attempting to capture any image information. Additionally or alternatively, an embodiment may disable the image capture device if it is detected that the mobile device is not parallel to a floor or ceiling. Thus, as discussed above, an embodiment may detect various characteristics related to a mobile device and the device's surroundings using a plurality of sensors. This allows for the device to conserve battery as well as ensure the most accurate image is captured prior to processing.

Once the image of the ceiling is captured at 110, an embodiment may identify at least one object within the captured image at 120. Brief reference will now be made to FIG. 2, which shows an example of a captured image being processed. First, an image capture device captures an image 210. An embodiment then performs a form of edge detection (e.g., canny edge detection), which results in a sharper image of black and white dots 220. An embodiment may then process the image in an effort to reduce image noise (e.g., by applying a Gaussian blur) at 230, as most edge detection algorithms can be sensitive to noise within an image.

A further embodiment may then discretize the image at 240. Discretization, as it relates to image processing converts each pixel of an image into a black foreground or a white background. Thus, an embodiment converts the colors and grays of the original image into singular black and white. By controlling discretization, unwanted parts of the original image can be removed. Through the use of each of the above mentioned steps, the processed image is now black and white with no gaps at 240. This allows an embodiment to accurately search for border points at 250. The border points are then connected and split to form parallel lines. Quadrants are identified (e.g., 6 quadrants, 8 quadrants, 9 quadrants, or 12 quadrants) and padded. An embodiment pads the quadrants by attempting to imitate what is anticipated past the border of the image. For example, the HVAC vent (e.g., diffuser) shown at 260 is not complete; thus, an embodiment may attempt to extend and generate/replicate the remainder of the image to complete any partial quadrant.

A further embodiment then applies perspective to make each quadrant a perfect square. Once the processed images are padded and squared, an embodiment will perform an affine transformation. An affine transformation is a linear mapping method that preserves points, straight lines, and planes. Sets of parallel lines remain parallel after an affine transformation. Generally, the affine transformation technique is used to correct for geometric distortions or deformations that occur with non-ideal camera angles. Finally, after the image is fully processed a pixel comparison is carried out in order to identify at least one object within the image at 120.

Referring back to FIG. 1, based on the one or more objects identified at 120, an embodiment generates a key matrix at 130. The key matrix is a mathematical representation of the objects identified in the ceiling image at 120. For example, an air diffuser may have a value of one (1), a fire detector a value of two (2), a speaker a value of three (3), a sprinkler a value of four (4), a blank/empty tile a value of zero (0), etc. Thus, a key matrix that contains these four objects may be represented as shown in FIG. 5A at 500.

Thus, once the key matrix is generated at 130, an embodiment may compare the generated key matrix against a larger known key matrix to determine if the captured image matches any pattern within the known key matrix at 140. Continuing from the previous key matrix example as shown in FIG. 5A, a known key matrix may contain the generated key matrix discussed herein. For example, a known key matrix may contain the above matrix as well as additional ceiling data for example as shown in FIG. 5B at 501 and including the previous key matrix example at 500.

In one embodiment, the known key matrix is a large matrix that may be created at an earlier time by a user or group of users. As the user(s) walk through a space, they can capture with an image capture device a plurality of ceiling images. In a further embodiment, location information is received through user input or automatically (e.g., known Wi-Fi locations, radio frequency identification (RFID) tags associated with specific areas, known locations of short range wireless devices, etc.) and may be associated with each of the plurality of images.

Moreover, in one embodiment, each of the plurality of captured images is associated with a determined specific location (e.g., a particular office or conference room). Once a portion or the entirety of a space is captured and identified via location, an embodiment creates the large comprehensive key matrix (i.e., a known key matrix). This large known matrix may be for an entire building, or sub-portions of the building. For example, a group of co-workers may walk through their office building and record the ceiling of each of the office space, conference room, break room etc. and assign or identify each room as being associated with a specific location on the known key matrix.

In a further embodiment, a known key matrix may be captured and stored on a mobile device. Because it is possible to reduce the large composite image set (i.e., the plurality of images captured as discussed herein) to simple matrix values, the processing power required to carry out all of the steps discussed (e.g., those in FIG. 1) is minimal. Thus, these processes may be carried out locally on the mobile device. However, it may also be beneficial to maintain or duplicate the known key matrix at a remote device. In addition to having a secondary source of information, the remote device may also offer benefits related to upkeep of the known matrix (e.g., if a ceiling tile changes, a single user may update the known matrix in a remote device which other uses may then access). It may also help during the creation of the known key matrix, because a group of users may then organize and separately collect the location and image information more efficiently.

The above discussed example of determining if a generated key matrix is present within a known key matrix is simplified. However, when an actual embodiment attempts to find a match between the two matrices, complications may arise. For example, the processing steps discussed herein may have inadvertently created an inaccurate key matrix and thus only a portion of the matrix values are found in the known matrix. Additionally, or alternatively, it may be that the generated key matrix is present multiple times within the known key matrix. Thus, determining if a match exists at 140 may not be a clear yes or no. In order to address this, one embodiment may calculate a match confidence score. For example, if a generated matrix is only partially found (e.g., seven (7) of the nine (9) matrix values) within the known matrix, it may only be able to receive a confidence score of 70% when compared to the known matrix.

In a further embodiment, if it is determined that the match confidence score is below a predetermined threshold, the mobile device may request validation from a remote device which contains a copy of the known key matrix. For example, an embodiment may transmit, to a remote device (e.g., server or cloud system), image information (e.g., the original image for processing or the processed image at any step of the processing) or the generated matrix data after processing. Based on the received information, the remote device may reprocess the image, perhaps with more advanced image processing tools (e.g., tools that require a large amount of processing power). This may result in a more accurate generated key matrix, thus improving the confidence score. Additionally, the known key matrix may be more complete or up-to-date on the remote device, due to updates from other users. Thus, in an embodiment a mobile device may transmit the aforementioned information to a remote device, and the remote device may verify if the mobile device's determination was correct or incorrect. In an additional embodiment, the predetermined threshold may be modified based on user preference. For example, a user may wish to have the highest accuracy possible, in which case the threshold would be set to a high value. Alternatively, a user may wish to conserve resources (e.g., data transmission, battery, etc.) by not regularly contacting the remote device, in which case the threshold would be set to a low value.

In addition to the image information (processed or not), an embodiment may send other information to the remote device. For example, an embodiment may detect, using a wireless communication device (e.g., short range wireless (Bluetooth), Wi-Fi, etc.), additional mobile devices within a known proximity. Thus, along with the image information, a mobile device may transmit a list with one or more additional mobile devices within proximity to the mobile device. Based on this information, the remote device may be able to better determine the location of the user. For example, if one of the additional devices had previously communicated to the remote device its location (e.g., passed along its image information or key matrix), that greatly narrows down the area the remote device must search in the known matrix. In an alternative example, the additional devices may not be in communication with the remote device; however, this information (e.g., the total device count in a room) may be useful as further discussed herein.

Once an embodiment determines if the generated key matrix matches a subset of the known key matrix at 140, it can respond in various ways. In one embodiment, if it is determined that a match does exist (e.g., the match is above a predetermined confidence score) a location associated with the generated key matrix is identified at 150. Similar to current location services, this identified location can be used for various tasks. For example, third party applications that benefit from knowing a user's location.

Additionally, an embodiment may communicate (e.g., using a wireless network system) with a building system (e.g., heating, ventilation, air conditioning, lighting, security, etc.). This allows the building system to dynamically respond to changes in human occupancy. For example, the building system may adjust the temperature or lighting of a room or area of a building based on the number of people occupying the space. As discussed herein, if a device can detect additional devices using a wireless communication device (e.g., short range wireless (Bluetooth), Wi-Fi, etc.) this information may be passed along to a building system. Thus, even if only one user in a room or area is in communication with the building system, a more accurate determination of the occupancy of an area can be determined.

In a further embodiment, a device setting may be modified or changed based on the detected location. By way of example, a mobile device may automatically set itself to a silent mode when it determines it is located within a particular space (e.g., a conference room). Another embodiment may preload or restrict specific applications based on the detected user location. For example, if a corporation determines that employees should only be able to access their encrypted data from specific building locations, an embodiment may restrict or allow access based on the identified location of the mobile device.

Alternatively, if an embodiment determines that the generated key matrix does not match a subset of the known key matrix (e.g., the match is below a predetermined confidence threshold) it may verify the match with a remote device at 160. The remote device may receive information as discussed herein to more accurately determine or verify a location.

Figure 3:
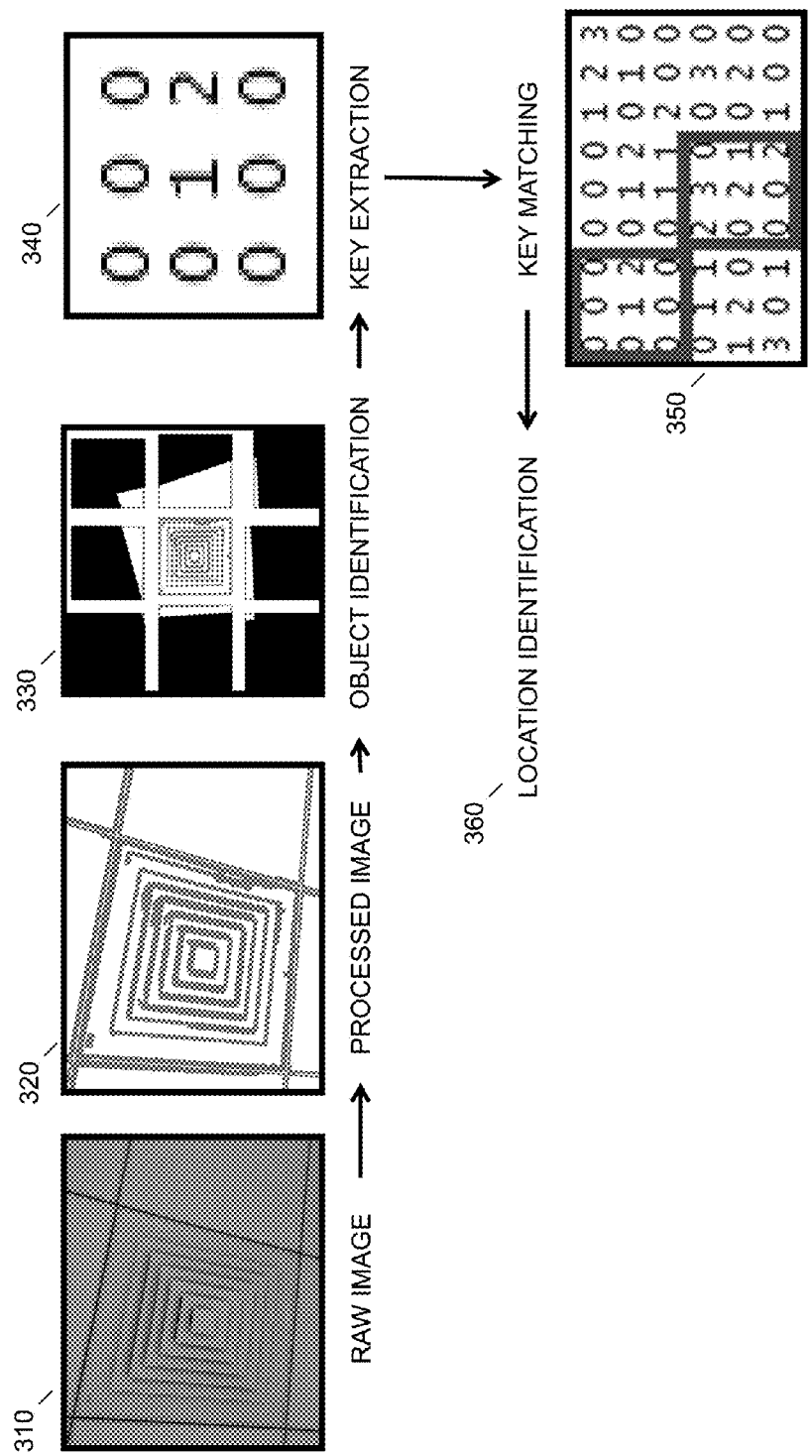
FIG. 3 illustrates another method for indoor location detection using ceiling patterns.

Referring now to FIG. 3, an embodiment is shown that captures raw image data at 310. The raw image data may then be processed at 320 to better enable the object detection at 330. The object detection at 330 identifies any known objects within the captured image and assigns them a value. Based on these assigned values, a key matrix is made through key extraction at 340. This generated key matrix is then compared to a known key matrix at 350 to determine if a potential match exists. Based on the match found at 350, a location is of the mobile device is identified at 360.

Figure 4:
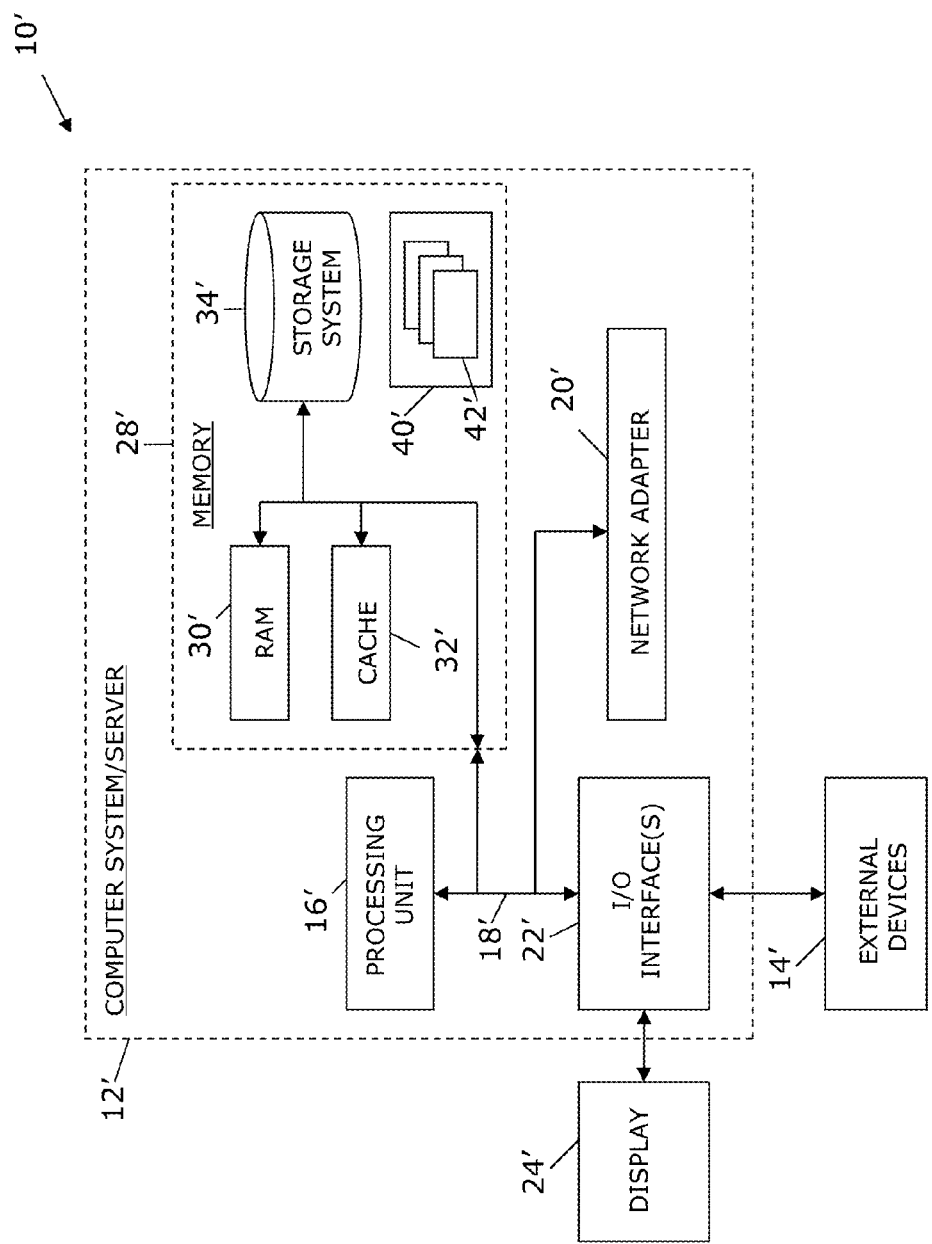
FIG. 4 illustrates an example computer system.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for location detection using an indoor ceiling pattern within a building, the method comprising:
 utilizing at least one processor to execute computer code that performs the steps of:
 capturing, using an image capture device, an image of the indoor ceiling pattern;
 identifying, within the image, at least one object using a pixel comparison technique on the image, wherein the identifying comprises processing the image by:
  reducing, using at least one image processing technique, image noise;
  sharpening, using at least one image processing technique, edges of the image;
  identifying, after the reducing and the sharpening, border points within the image;
  connecting and splitting the identified border points to form parallel lines;
  identifying quadrants within the image and padding partial quadrants; and
  making each quadrant a square by applying perspective to each quadrant;
 generating, based on the at least one object, a key matrix, wherein the key matrix comprises a numerical representation of the at least one object and wherein each type of object is represented as a different value within the key matrix;
 determining if the key matrix matches a subset of a known key matrix; and
 responsive to the determining, identifying, based on the known key matrix, a location of the image capture device within the building.

2. The method of claim 1, comprising:
 capturing, with an image capture device, a plurality of indoor ceiling images;
 receiving location information associated with the plurality of indoor ceiling images; and
 generating, based on the plurality of indoor ceiling images and the location information, the known key matrix.

3. The method of claim 1, wherein the determining comprises, calculating a match confidence score.

4. The method of claim 3 comprising: requesting, if the match confidence score is below a predetermined threshold, validation of the subset that matches the key matrix from a remote device, wherein the known key matrix is stored on the remote device.

5. The method of claim 4, comprising:
 detecting, using a wireless connection device, one or more additional devices;
 wherein the requesting validation comprises transmitting information associated with the one or more additional devices; and
 wherein the one or more additional devices are associated with another key matrix.

6. The method of claim 1, comprising communicating, using a wireless network device, with a building system, the building system comprising at least one of: a heating system, a ventilation system, an air conditioning system, a lighting system, and a security system;
 wherein based on the communicating the building system takes an action.

7. The method of claim 1, comprising modifying a device setting of the image capture device based on the identified location of the image capture device.

8. The method of claim 1, wherein the known key matrix is stored on at least one of: a remote device and a local device.

9. The method of claim 1, the capturing comprises:
 detecting, using one or more sensors, that the image capture device is oriented to capture an image of a ceiling;

detecting, using a sensor, that the image capture device is stationary; and capturing, using the image capture device, an image of a ceiling.

10. An apparatus for location detection using an indoor ceiling pattern within a building, the apparatus comprising:
at least one processor; and
a computer readable storage medium having computer readable program code embodied therewith and executable by the at least one processor, the computer readable program code comprising:
computer readable program code that captures, using an image capture device, an image of the indoor ceiling pattern;
computer readable program code that identifies, within the image, at least one object using a pixel comparison technique on the image wherein the identifying comprises processing the image by:
reducing, using at least one image processing technique, image noise;
sharpening, using at least one image processing technique, edges of the image;
identifying, after the reducing and the sharpening, border points within the image;
connecting and splitting the identified border points to form parallel lines;
identifying quadrants within the image and padding partial quadrants; and
making each quadrant a square by applying perspective to each quadrant;
computer readable program code that generates, based on the at least one object, a key matrix, wherein the key matrix comprises a numerical representation of the at least one object and wherein each type of object is represented as a different value within the key matrix;
computer readable program code that determines if the key matrix matches a subset of a known key matrix; and
computer readable program code that, responsive to the determining, identifies, based on the known key matrix, a location of the image capture device within the building.

11. A computer program product for location detection using an indoor ceiling pattern within a building, the computer program product comprising:
a non-transitory computer readable storage medium having computer readable program code embodied therewith, the computer readable program code comprising:
computer readable program code that captures, using an image capture device, an image of the indoor ceiling pattern;
computer readable program code that identifies, within the image, at least one object using a pixel comparison technique on the image, wherein the identifying comprises processing the image by:
reducing, using at least one image processing technique, image noise;
sharpening, using at least one image processing technique, edges of the image;
identifying, after the reducing and the sharpening, border points within the image;
connecting and slitting the identified border points to form parallel lines;
identifying quadrants within the image and padding partial quadrants; and
making each quadrant a square by applying perspective to each quadrant;
computer readable program code that generates, based on the at least one object, a key matrix, wherein the key matrix comprises a numerical representation of the at least one object and wherein each type of object is represented as a different value within the key matrix;
computer readable program code that determines if the key matrix matches a subset of a known key matrix; and
computer readable program code that, responsive to the determining, identifies, based on the known key matrix, a location of the image capture device within the building.

12. The computer program product of claim 11, comprising computer readable program code that captures, with an image capture device, a plurality of indoor ceiling images;
computer readable program code that receives location information associated with the plurality of indoor ceiling images; and
generating, based on the plurality of indoor ceiling images and the location information, the known key matrix.

13. The computer program product of claim 11, wherein the determining comprises calculating a match confidence score.

14. The computer program product of claim 13, comprising computer readable program code that requests, if the match confidence score is below a predetermined threshold, validation of the subset that matches the key matrix from a remote device, wherein the known key matrix is stored on the remote device.

15. The computer program product of claim 14, comprising:
computer readable program code that detects, using a wireless connection device, one or more additional devices;
wherein the requesting validation comprises transmitting information associated with the one or more additional devices; and
wherein the one or more additional devices are associated with another key matrix.

16. The computer program product of claim 11, comprising computer readable program code that communicates, using a wireless network device, with a building system, the building system comprising at least one of: a heating system, a ventilation system, an air conditioning system, and a lighting system.

17. The method of claim 11, comprising computer readable program code that modifies a device setting of the image capture device based on the identified location of the image capture device.

18. The computer program product of claim 11, wherein the known matrix is stored on at least one of: a remote device and a local device.

19. The computer program product of claim 11, comprising:
computer readable program code that detects, using one or more sensors, that the image capture device is oriented to capture an image of a ceiling;
computer readable program code that detects, using a sensor, that the image capture device is stationary; and
computer readable program code that captures, using the image capture device, an image of a ceiling.

20. A method, comprising:
utilizing at least one processor to execute computer code that performs the steps of:
creating a numerical representation of an image captured via a mobile device, the image comprising ceiling tiles, wherein the numerical representation comprises a key matrix and wherein each type of object included in the image is represented as a different value within the key matrix, wherein the creating a numerical representation comprises processing the image by:

reducing, using at least one image processing technique, image noise;

sharpening, using at least one image processing technique, edges of the image;

identifying, after the reducing and the sharpening, border points within the image;

connecting and splitting the identified border points to form parallel lines;

identifying quadrants within the image and padding partial quadrants; and making each quadrant a square by applying perspective to each quadrant;

searching for the key matrix within a known matrix, wherein the known matrix comprises a numerical representation of a known ceiling pattern within a building;

responsive to finding the key matrix within the known matrix, identifying, based on the known matrix, a location represented by the key matrix; and identifying a location, based on the represented location, of the mobile device when the image is captured.

* * * * *